United States Patent [19]

Hollenbaugh, Sr.

[11] Patent Number: 4,893,862
[45] Date of Patent: Jan. 16, 1990

[54] REMOVABLE CARGO BED LINER
[75] Inventor: Robert A. Hollenbaugh, Sr., Erie, Pa.
[73] Assignee: R & R Enterprises, Erie, Pa.
[21] Appl. No.: 274,393
[22] Filed: Nov. 21, 1988

Related U.S. Application Data

[63] Continuation of Ser. No. 60,639, Jun. 11, 1987, abandoned.

[51] Int. Cl.[4] ............................................. B62D 25/00
[52] U.S. Cl. .................................... 296/39.1; 296/76; 224/42.42
[58] Field of Search ...................... 296/39.1, 39.2, 76, 296/37.16; 224/42.42 R

[56] References Cited

U.S. PATENT DOCUMENTS 818,257  4/1906  Kennedy ........................... 296/39.1
2,898,146  8/1959  Yudenfreund ..................... 296/39.1

FOREIGN PATENT DOCUMENTS 2118109  10/1983  United Kingdom ............... 296/39.1

Primary Examiner—Robert R. Song
Attorney, Agent, or Firm—Charles L. Lovercheck; Wayne L. Lovercheck; Dale R. Lovercheck

[57] ABSTRACT

The cargo area liner of the invention is used in combination with a utility vehicle having a containment portion. In a preferred embodiment of the invention the cargo area liner includes a foldable body. The foldable body has a bottom and sides. The bottom is connected to the sides. The sides are adapted to rotate about 90 degrees from a folded position to an open position. The sides are connected to the botom and are adjacent to the bottom member. The bottom has a first and a second portion, the upper faces of which are in contact when the liner is in fully folded position. In another embodiment of the invention, an inner bottom mmeber and inner side member are slid inwardly and outwardly in an outer bottom member to adjust the length of the liner. In an embodiment of the invention adapted for automobile trunks, the liner includes a base having an upwardly extending flange and sides. Each of the sides has an upper and lower portion extending at an obtuse angle. A side flange adapted to realeasably engage the base flange extends from the lower portion.

1 Claim, 7 Drawing Sheets

REMOVABLE CARGO BED LINER

This is a continuation of 07/060,639 06/11,87, now abandoned.

BACKGROUND OF THE INVENTION

The invention relates to cargo bed liners for vehicles. The invention provides improved cargo bed liners which are adjustable in length and readily removable fro mthe cargo bed. The cargo bed liners of the invention require less shipping and storage space than prior art cargo bed liners.

Prior art cargo bed liners are not adapted to be removable or adjustable in length. The prior art cargo bed liners are bulky and require a significant amount of space for transportation and storage prior to installation. The improvements of the present invention beneficially provide a novel, non-obvious and useful cargo bed liner which is removable, adjustable in length and requires less space than those of the prior art.

Dresen et al. in U.S. Pat. No. 4,592,583 discloses a corrugated truck cargo bed liner. Munoz et al. in U.S. Pat. No. 4,333,678 discloses a knock down bed liner assembly. The liners of Dresen et al. and Munoz et al. are neither adjustable in length nor readily removed after installation as are the liners of the present invention.

Wayne in U.S. Pat. No. 4,341,412; Lambitz in U.S. Pat. No. 4,047,749 and Lorenzen, Jr. in U.S. Pat. No. 3,814,473 each disclose a one-piece truck bed liner.

Markos in U.S. Pat. No. 4,575,146 discloses a liner retainer.

The truck cargo bed liners of the above prior art are not readily removable, adjustable in length or adapted for compact storage after installation. The truck cargo bed liners of the present invention are readily removable, adjustable in length and adapted for compact storage after installation.

It is an object of the invention to provide a readily removable cargo area liner which is adapted for compact storage upon removal. The cargo area liners of the invention are adapted for temporary installation over carpeted areas such as is found in vans, mini-vans and station wagons.

Another object of the invention is to provide an expandable readily removable cargo area liner which is adapted for compact storage upon removal. The cargo area liners of the invention are adapted for expandable temporary installation in the containment portion of a utility vehicle. This provides protection for the area of the containment portion which is used for utility purposes.

BRIEF DESCRIPTION OF THE INVENTION

The problems of the prior art are overcome by the improved readily removable cargo area liner of the present invention. The cargo area liner of the invention is used in combination with a utility vehicle having a containment portion.

In a preferred embodiment of the invention the cargo area liner includes a foldable body. The foldable body has a bottom and sides. The bottom is connected to the sides. The sides are adapted to rotate about 90 degrees from a folded position to an open position. The sides are connected to the bottom and are located adjacent to the bottom member. The bottom has a first and a second portion, the upper faces of which are in contacat when the liner is in fully folded position.

In another preferred embodiment of the invention an inner bottom member is slid inwardly and outwardly of an outer bottom member to adjust the length of the liner.

In an embodiment of the invention adapted for automobile trunks, the liner includes a base having an upwardly extending flange and sides. Each of the sides has an upper and a lower portion extending at an obtuse angle. A side flange adapted to releasably engage the base flange extends from the lower portion.

BRIEF DESCRIPTION OF THE DRAWINGS

The objects, features and advantages of the present invention will become more fully apparent from the following detailed description of the preferred embodiments, the appended claims and the accompanying drawings in which:

DETAILED DESCRIPTION OF THE PREFERRED EMBODIMENT

Each of the embodiments of the invention is used in combination with a utility vehicle having a containment portion. In some utility vehicles the containment portion is carpeted or is otherwise appointed for appearance and style, but not suitably for the rough use and abuse that the cargo areas were originally intended for. This invention is useful for the utility vehicle which is occasionally used as a cargo hauler and is normally used for personal transportation only. In these vehicles the cargo area liner of the invention is positioned within the containment portion over the carpeting and finished interior to protect it from damage during hard use.

Figure 1:
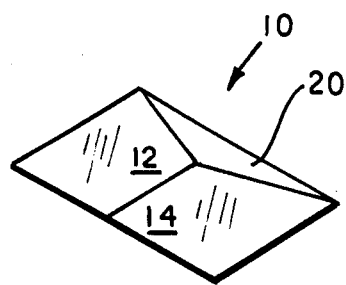
FIG. 1 is a perspective view of a folding readily removable cargo area liner in accordance with the invention in its fully folded position.

In FIG. 1, the liner 10 is shown completely folded to a compact flat unit.

Figure 2:
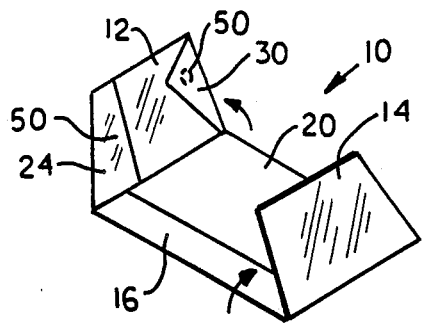
FIG. 2 is a perspective view of a folding readily removable cargo area liner in accordance with the invention with two of its ends open.

In FIG. 2, the liner 10 is shown with left panel 12 and right panel 14 swung up perpendicular to rear bottom panel 16 and front panel 20 coextensive with rear bottom panel 16.

Figure 3:
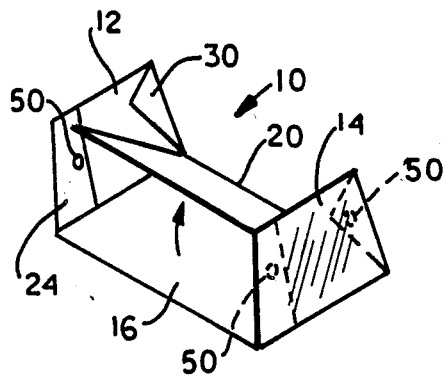
FIG. 3 is a perspective view of a folding readily removable cargo area liner in accordance with the invention shown with a bottom section lifted.
Figure 6:
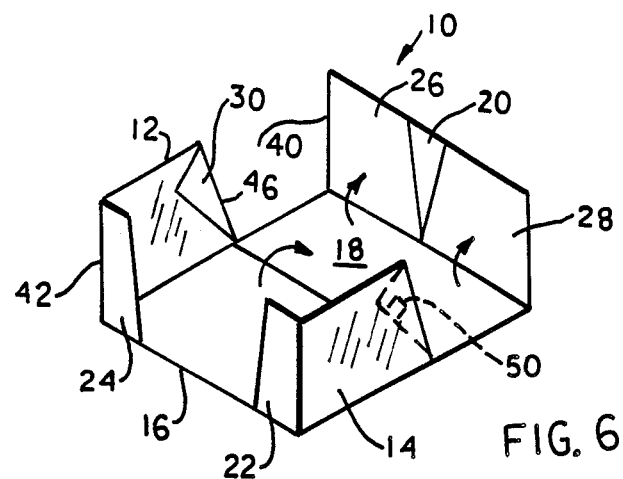
FIG. 6 is a perspective view of a folding readily removable cargo area liner in accordance with the invention shown with both bottom sections in fully open position.
Figure 7:
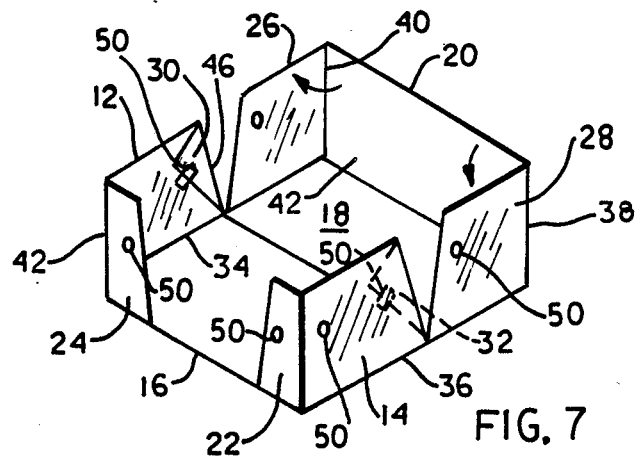
FIG. 7 is a perspective view of a folding readily removable cargo area liner in accordance with the invention shown with its sides swung into open position.
Figure 8:
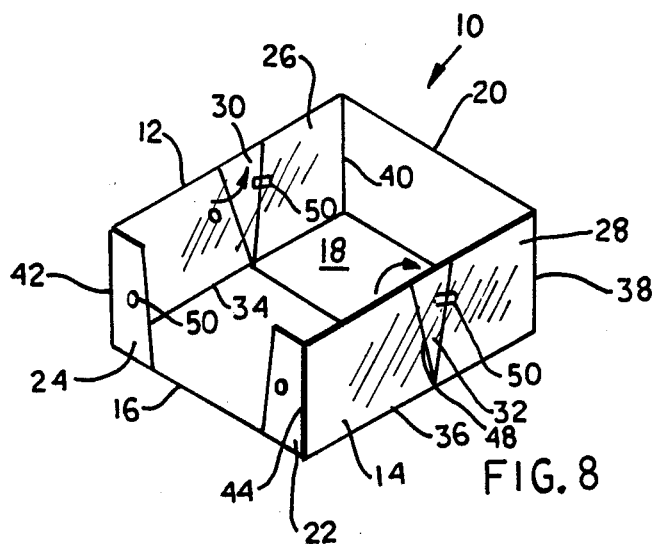
FIG. 8 is a perspective view of a folding readily removable cargo area liner in accordance with the invention shown in a fully open position.

FIG. 3 is like FIG. 2 except front panel 20 is swing up part way to its fully open position shown in FIGS. 6 through 8.

Figure 4:
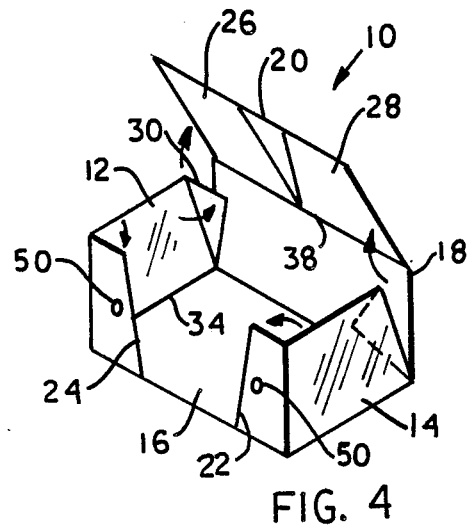
FIG. 4 is a perspective view of a folding readily removable cargo area liner in accordance with the invention shown as a bottom section and end lifted.

FIG. 4 shows front panel 20 swung away from front bottom panel 18 with left front side panel 26 and right side panel 28 remaining in their position coextensive with first panel 20.

Figure 5:
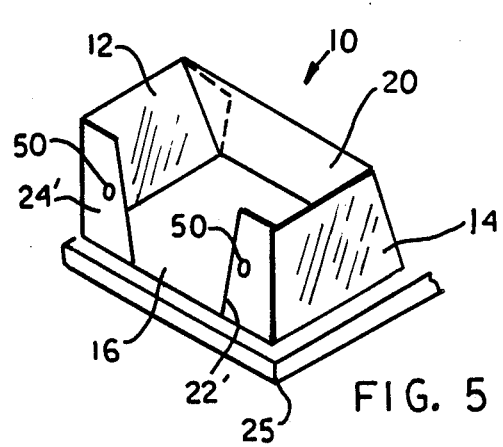
FIG. 5 is a perspective view of a folding readily removable cargo area liner in accordance with the invention in a partly open position.

FIG. 5 shows panels 12 through 16 remaining in the same position shown in FIGS. 2 through 4 and with left rear panel 24 and right rear panel 22 swung to position normal to side panels 12 and 14 respectively and front panel 20 swung normal to rear bottom panel 16.

FIG. 6 shows panels 12 through 28 in the same position as in Figure 5, but with front bottom panel 18 swung down to a position coplanar to rear bottom panel 16 and front panel 20 swung to normal position relative to front bottom panel 18.

FIG. 7 shows panels 12, 14, 16, 18, 20, 22 and 24 in the same positions as shown in FIG. 6, but with front side panels 26 and 28 swung to position normal to front panel 20.

FIG. 8 shows the cargo liner 10 in fully open position. The cargo area liner 10 may be made of a single integral piece of sheet materials with all of the panels connected by integral hinges. For example, the liner 10 could be made of cardboard with the hinges 34, 36, 37, 38, 40, 42, 44, 46, 48 and 60 made by scoring the cardboard along the hinge lines 34, 36, 37, 38, 40, 42, 44, 46, 48 and 60 or the liner 10 could be made of thermoplastic with hinges 34, 36, 38, 40, 42, 44, 46, 48 and 60 made of thin interconnecting parts known as "living hinges".

FIGS. 9 through 12 show another embodiment of the invention being a knock down cargo liner 110 having the parts shown.

FIGS. 13 through 16 show another embodiment of the cargo liner.

In FIG. 8, the one-piece cargo area liner 10 is shown completely unfolded to open position. In the embodiment of FIGS. 1 through 8, rear bottom panel 16 is shown connected to front bottom panel 18 by integral living hinge 60; left side panel 12 is shown connected to rear bottom panel 16 by integral hinge 34; right side panel 14 is shown connected to rear bottom 16 by integral hinge 36; left front side panel 26 is connected to front panel 20 by integral hinge 40; right front panel 28 is connected to front panel 20 by integral hinge 38; front panel 20 is connected to front bottom 18 by integral hinge 37; left rear panel 12 is connected to left rear side panel 24 by integral hinge 42; right rear panel 22 is connected to right side panel 14 by hinge 44; left side flap 30 is connected to left rear panel 12 by integral hinge 46; right side panel 32 is connected to right rear panel 14 by integral hinge 48.

The panels and sides are held in their open position by Velcro (TRADEMARK), snaps or other fasteners indicated at 50. These fasteners are located along the adjacent edges of the sides and panels.

FIGS. 6 through 8 show a perspective view of folding readily removable cargo area liner 10 being unfolded to a open position. In FIG. 6, bottom members 16 and 18 are in fully open position. Also, sides 12, 14 and 20 are in fully open position in FIG. 6. First front side panel 26 and second front side panel 28 have been swung into open position, shown in FIG. 7. In FIG. 8, side panels 30 and 32 have been swung 180 degrees into open position, and the liner 10 is in a fully open position. This large open position is useful when seats are removed or folded to allow a larger portion of the containment area to be used for utility purposes.

Figure 9:
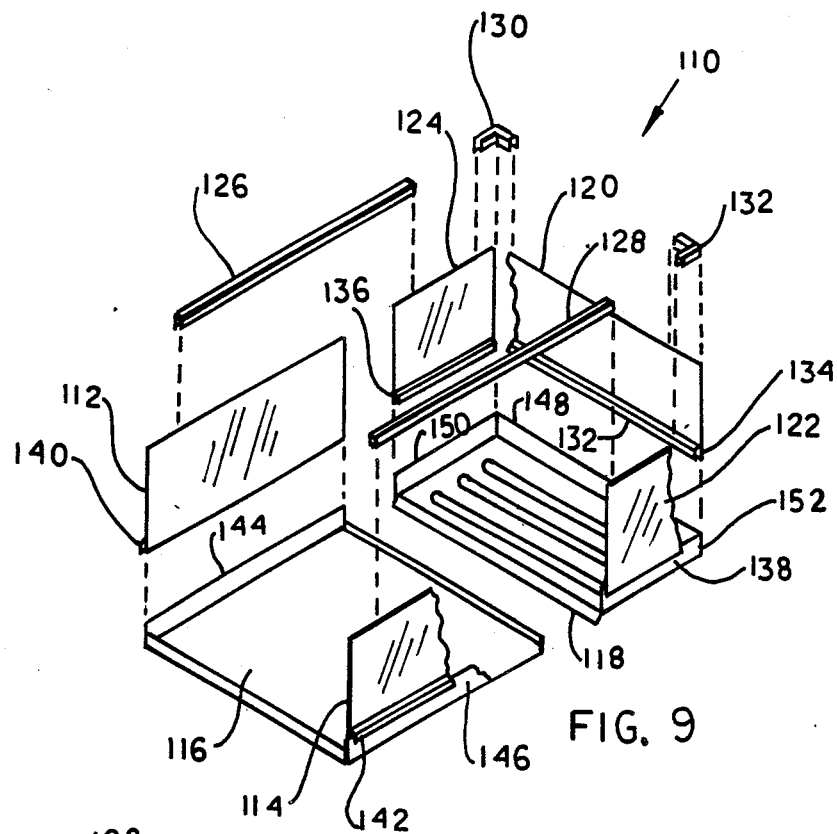
FIG. 9 is a perspective exploded view of a knock apart telescopic readily removable cargo area liner in accordance with another embodiment of the invention.

FIG. 9 shows a perspective view of a knock apart telescopic readily removable cargo area liner 110 in accordance with the invention. The cargo area liner 110 includes rear left side 112 and right rear side 114, rear bottom panel 116, front bottom member 118, front panel 120, right panels 122 and 124, front side channels 126 and 128 and corner channels 130 and 132. Front panel 120 is held to front side panels 122 and 124 by channels 132 and 130 respectively. Front side panels 122 and 124 are held to side panels 114 and 112 by channels 128 and 126 respectively. Front panel 120 and side panels 122 and 124 have flanges 134, 136 and 138 respectively. Rear left side 112 and right rear side 114 have flanges 140 and 142 respectively. Rear bottom panel 116 has guide flanges 144 and 146. Front bottom member 118 has flanges 148, 150 and 152.

The rear side flanges 140 and 142 releasably receive the adjacent outer bottom member guide flanges 144 and 146 respectively. The front panel flanges 134, 136 and 138 releasably receive the adjacent inner bottom member flanges 148, 150 and 152 respectively.

Side channel 126 releasably engages rear side 112 and front side 124. Linear channel 128 releasably engages rear side panel 114 and front side 122.

Figure 10:
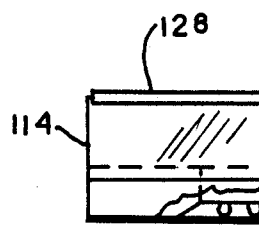
FIG. 10 is a side view of a part of a knock apart telescopic readily removable cargo area liner in accordance with the invention with an outer flange partly broken away to show the liner in its unextended position.
Figure 11:
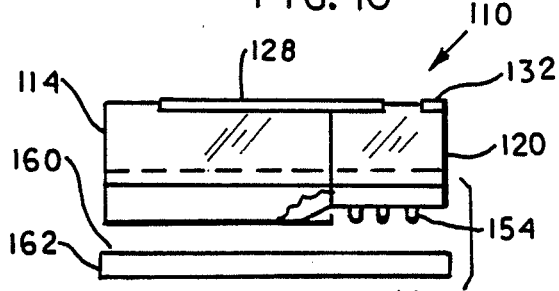
FIG. 11 is a side view of a knock apart telescopic readily removable cargo area liner in accordance with the invention in its fully extended position.

The inner bottom member 118 is adapted to be moved between an unextended position, as shown in FIG. 10, to an extend position, as shown in Figure 11. A substantial portion of the inner bottom member 118 is positioned to overlie outer bottom member 116 in the unextended position. A substantial portion of inner bottom member 118 is positioned adjacent to outer bottom member 116 in the extended position.

Corner channel 130 releasably engages inner sides 120 and 124. Corner channel 132 releasably engages inner sides 120 and 122. Ribs 154 extend from the lower face of front bottom member 118. In the collapsed position, shown in Figure 10, the bottom face of each rib 154 is in contact wth rear bottom member 116.

Figure 12:
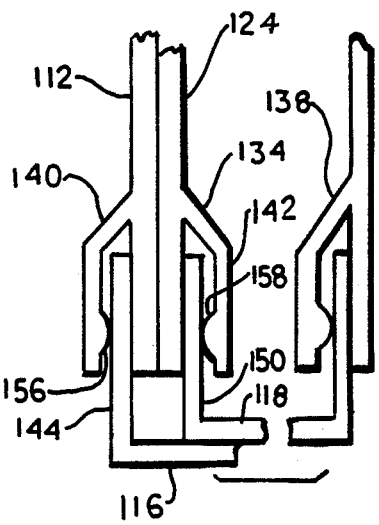
FIG. 12 is a partial rear end view of a knock apart telescopic readily removable cargo area liner in unextended position in accordance with the invention.

FIG. 12 shows a partial end view of liner 110. Rib 156 extends from outer side flanges 140 and contacts flange 144. Rib 158 extends from inner side flange 136 and contacts flange 150.

Cargo area liner 110 is shown in FIG. 11 on carpeting 160 supported by floor 162 of the containment area of a utility vehicle.

Figure 13:
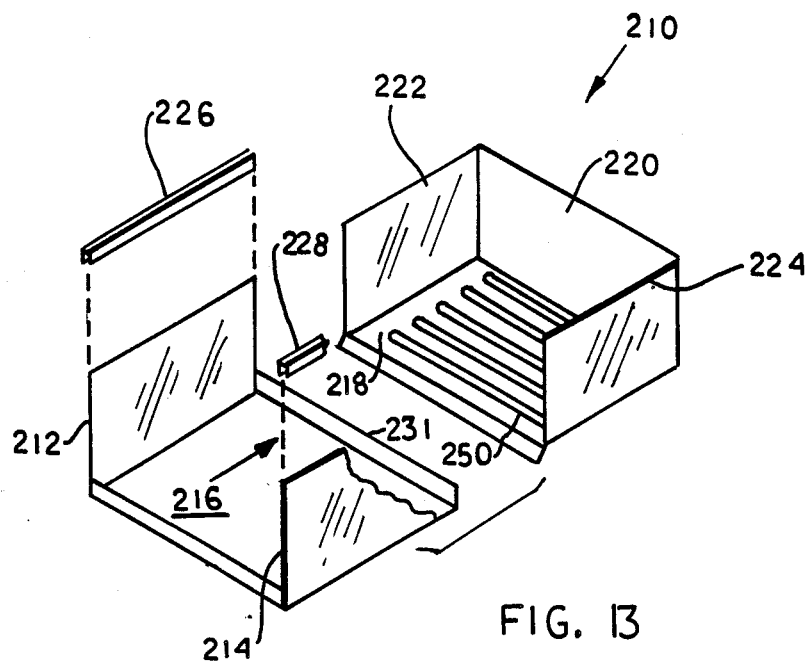
FIG. 13 is an exploded perspective view of a telescopic readily removable cargo area liner in accordance with the invention.

FIG. 13 shows a telescopic readily removable cargo area liner 210. FIG. 13 is a perspective view of the telescopic extendable readily removable cargo area liner 210. Liner 210 includes rear sides 212 and 214, an rear bottom member 216, a front bottom member 218, front sides 220, 22 and 224 and channels 226 and 228. The front bottom member 218 is connected to first end 220 and front sides 22 and 224. The rear bottom member 216 is connected to rear sides 212 and 214.

Channel 226 releasably engages outer side wall 212 and inner side wall 222. Channel 228 releasably engages outer side wall 214 and inner side wall 224.

Figure 14:
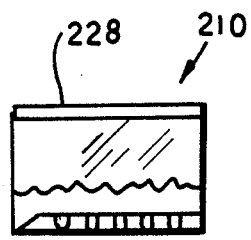
FIG. 14 is a side view of a telescopic readily removable cargo area liner in accordance with the invention shown in its unextended position.
Figure 15:
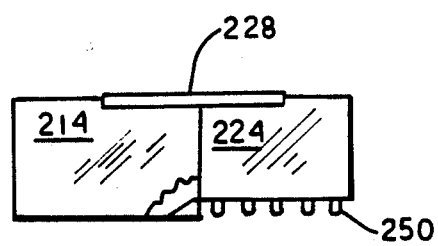
FIG. 15 is a side view of a telescopic readily removable cargo area liner in accordance with the invention shown in its fully extended position.
Figure 17:
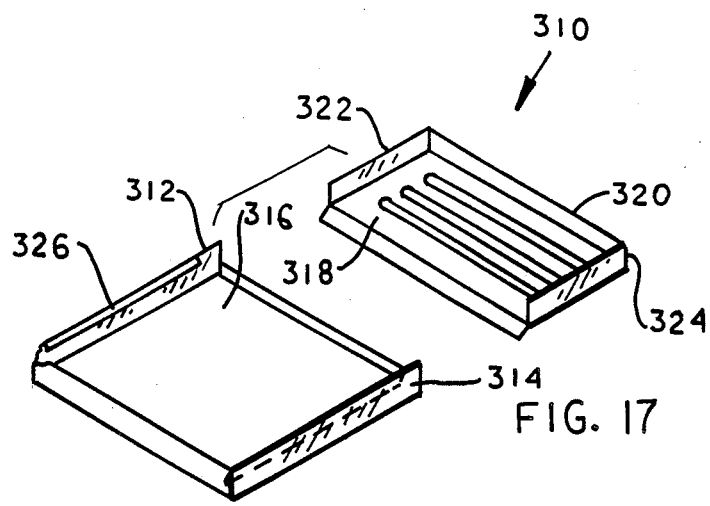
FIG. 17 is a perspective view of a telescopic readily removable cargo area liner having flanges on two of its sides in accordance with the invention.

Front bottom member 218 is adapted to be moved between an unextended position, as shown in FIG. 14, to an extended positon as shown in FIG. 15. A substantial portion of front bottom member 218 is positioned within rear bottom member 216 in the unextended position. A substantial portion of front bottom member 218 is positioned adjacent to rear bottom member 216 in the extended position.

Figure 16:
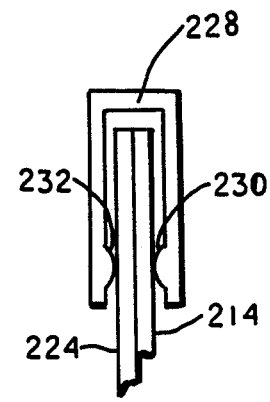
FIG. 16 is a partial end view of a telescopic readily removable cargo area liner in accordance with the invention.

FIG. 16 is a partial end view of a telescopic readily removable cargo area liner. Channel 228 includes inner ribs 230 and 232 which are in contact with outer side 214 and inner side 224.

Figure 18:
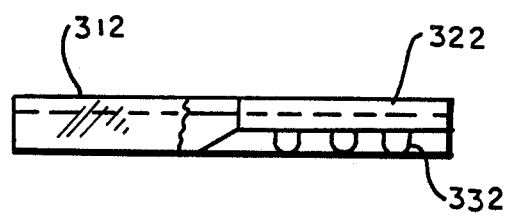
FIG. 18 is a side view of a telescopic readily removable cargo area liner having flanges on two of its sides in accordance with the invention shown in its unextended position.
Figure 20:
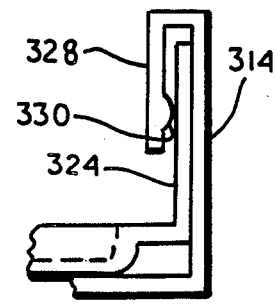
FIG. 20 is a partial end view of a telescopic readily removable cargo area liner having flanges on two of its sides in accordance with the invention.
Figure 19:
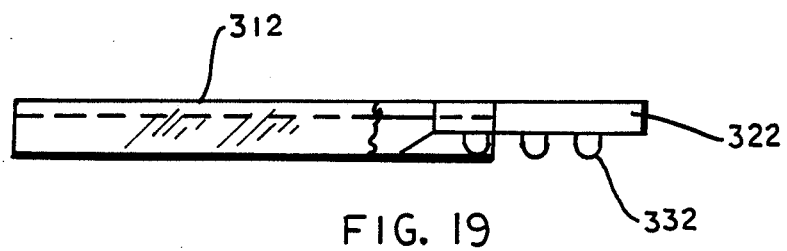
FIG. 19 is a side view of a telescopic readily removable cargo area liner having flanges on two of its sides in accordance with the invention shown in its fully extended position.

FIGS. 17 through 20 show a telescopic readily removable cargo area liner 310. Liner 310 includes outer sides 312 and 314, an outer bottom member 316, an inner bottom member 318 and inner sides 320, 322 and 324. Outer sides 312 and 314 are connected to flanges 326 and 328 respectively. Inner side 322 is adapted to slide between flange 326 and side 312. Inner side 324 is adapted to slide between flange 328 and side 314.

inner bottom member 318 is adapted to be moved between an unextended position, as shown in FIG. 18, to an extended position as shown in FIG. 19. A substantial portion of inner bottom member 318 is positioned within outer bottom member 316 in the unextended position. A substantial portion of inner bottom member 318 is positioned adjacent to outer bottom member 316 in the extended position. Inner bottom member 318 has ribs 332 which are in contaact with the upper face of outer bottom member 316 in the unextended position. Flanges 326 and 328 have a rib such as rib 330 which engages inner side 324 as shown in FIG. 20. an upwardly extending rear flange 336 fixed to the rear end of the outer bottom 316 and an upwardly extending front flange 338 fixed to the front end of the outer bottom part 316

FIG. 21 through 24 show a smaller version of the unit to be used in the "trunk cargo area" of standard coupe and sedan type vehicles (passenger cars).

Figure 21:
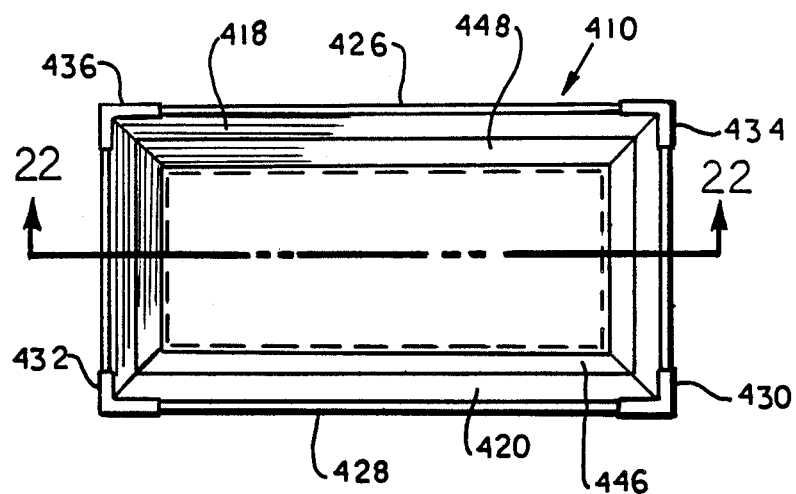
FIG. 21 is a top view of a telescopic readily removable cargo area liner having four flanges supporting for detachable sides in their upright position in accordance with the invention.
Figure 22:
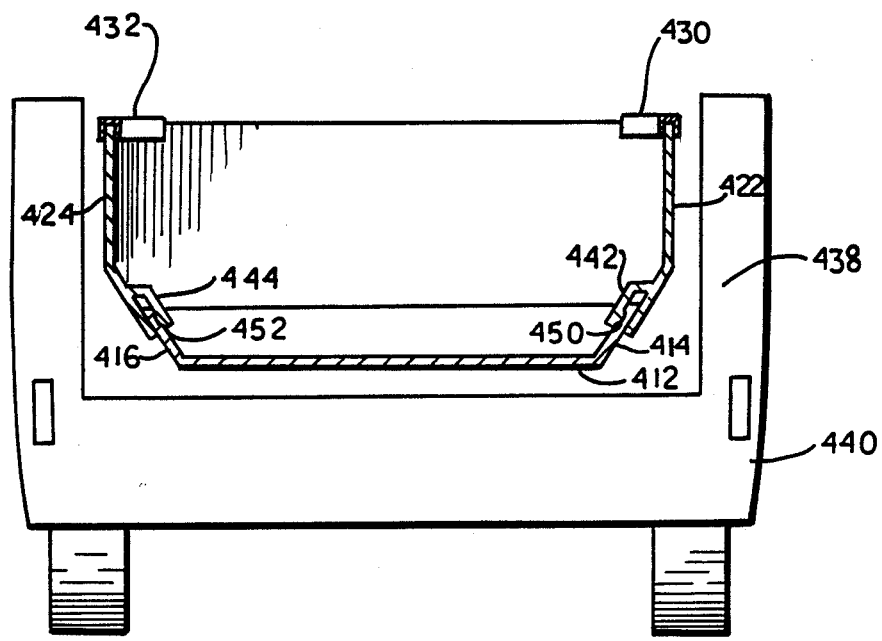
FIG. 22 is a side view of a telescopic readily removable cargo area liner having four flanges supporting four detachable sides in their upright position in accordance with the invention.

FIGS. 21 and 22 show a more compact version. Panels 422, 424, 426 and 420 snap over bottom pan 412. Brackets 430, 432, 434 and 436 fit over the four corners to provide rigidity to the unit. Bottom pan 412 is a molded one-piece unit which would be waterproof. The unit in FIGS. 21 through 24 would fit down into the trunk well whichs is present in most passenger cars.

Figure 23:
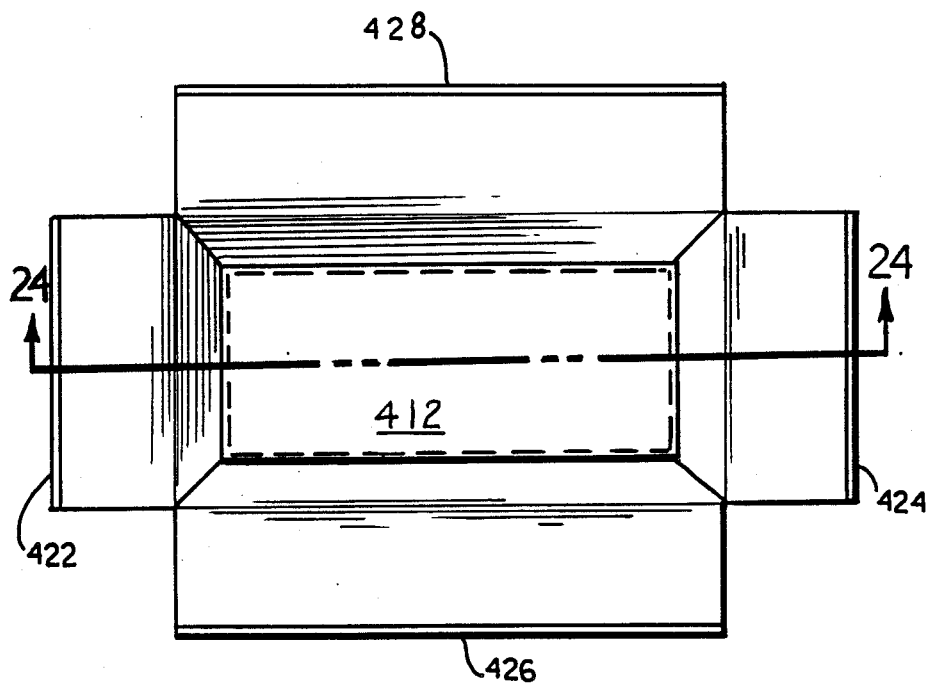
FIG. 23 is a top view of a readily removable cargo area liner having four flanges supporting four detachable sides in their outward position in accordance with the invention.
Figure 24:
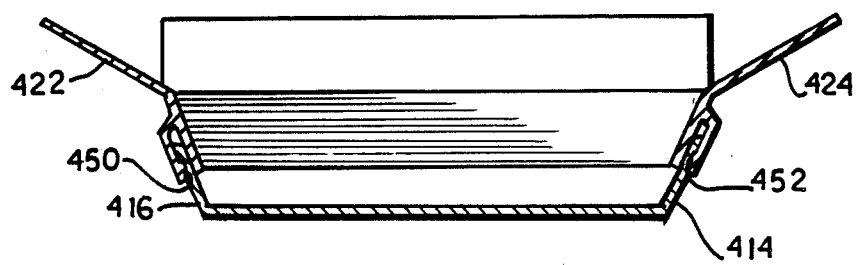
FIG. 24 is a side view of a telescopic readily removable cargo area liner having four flanges supporting four detachable sides in their outward position in accordance with the invention.

FIGS. 23 and 24 show the same unit with panels reversed to accomodate larger items needing to be carried in the same trunk area.

This unit could be easily disassembled and stored within bottom pan 412 which could easily be stored in a garage area, or attached to the trunk lid with two rubber straps. This way it would be accessible whenever needed.

FIG. 21 through 24 show a readily removable cargo area liner 410. Liner 410 includes base member 412 having four flange members 414, 416, 418 and 420 supporting four detachable sides 422, 424, 426 and 428 respectively. Each of the sides has an upper and a lower portion extending from an obtuse angle therebetween. Corner channels 430, 432 and 436 releasably engage the sides as shown in FIG. 21.

Liner 410 is adapted for use in the trunk 438 of a coupe or sedan automobile 440 as shown in FIG. 22. The side flanges 442, 444, 446 and 448 releasably engage the adjacent base flange members 414, 416, 418 and 420 respectively. With the sidesin the upright position as shown in FIGS. 21 and 22, the liner is in an unenlarged position and is adapted to fit into a small trunk. By placing the sides on the opposite flange members of the base as shown in FIGS. 23 and 24, the liner is in an enlarged position and is adapted to fit into a large trunk.

Ribs 450 and 452, which extend from side flanges 442 and 444 respectively, contact base flange members 414 and 416 respectively as shown in FIG. 22. In the enlarged position ribs 450 and 452 respectively contact base flange members 416 and 414 respectively as shown in FIG. 24.

The cargo area liners of the invention are preferably made of polymeric material, wood, metal or paper board material and the like. Examples of preferred polymeric materials are polypropylene and polystyrene.

While the present invention has been disclosed in connection with the preferred embodiment thereof, it should be understood that there may be other embodiments which fall within the spirit and scope of the invention as defined by the following claims.

What is claimed is:

1. A cargo area liner for a vehicle comprising a bottom panel, a first side panel, a second side panel, a first end panel, a second end panel, the bottom panel having a first side flange, a second side flange, a first end flange and a second end flange at a first side, a second side, a first end and a second end thereof respectively, said end flanges and said side flanges of said bottom panel being integrally attached to said bottom panel and extending upwardly and outwardly therefrom, said first end panel having a first part and a second part, said second end panel having a first part and a second part, said first side panel having a first part and a second part, said second side panel having a first part and a second part, said first part of said first side panel and said first part of said second side panel and said first part of said first end panel and said first part of said second end panel extending upwardly and outwardly and integrally attached to said second parts of said side panels and said end panels respectively, first means supporting said first part of said first end panel on said second side flange, second means supporting said first part of said second end panel on said first side flange, third means supporting said first part of said first side panel on said first end flange and fourth means supporting said first part of said second side panel on said second end flange respectively, said first side panel and said second side panel each having a first end and a second end, said first end panel and said second end panel each having a first end and a second end engaging said first ends and said second ends of said end panels at a first angular corner, a second angular corner, a third angular corner and a fourth angular corner, angular corner members, said angular corner members, being U-shaped in cross section, and receiving the upper ends of said second parts of said end panels at said corners holding said side panels and said end panels in end-to-end relation to each other, whereby said bottom panel, said side panels and said end panels provide a cargo area liner for a vehicle.

* * * * *